(12) United States Patent
Romero et al.

(10) Patent No.: US 8,854,983 B2
(45) Date of Patent: Oct. 7, 2014

(54) DATA PATH UTILIZATION FOR LOW LEVEL PATTERN GENERATION AND CHECKIING

(75) Inventors: Gabriel L. Romero, Colorado Springs, CO (US); Coralyn S. Gauvin, Manitou Sorings, CO (US)

(73) Assignee: LSI Corporation, San Jose, CA (US)

( * ) Notice: Subject to any disclaimer, the term of this patent is extended or adjusted under 35 U.S.C. 154(b) by 349 days.

(21) Appl. No.: 12/960,279

(22) Filed: Dec. 3, 2010

(65) Prior Publication Data

US 2012/0140840 A1   Jun. 7, 2012

(51) Int. Cl.
| | |
|---|---|
| G01R 21/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 1/24 | (2006.01) |
| H04L 25/03 | (2006.01) |

(52) U.S. Cl.
CPC ......... *H04L 25/03866* (2013.01); *H04L 1/244* (2013.01)
USPC ........... 370/242; 370/241; 370/243; 370/244; 370/245

(58) Field of Classification Search
CPC ........... H04L 1/242; H04L 1/244; H04L 1/24; H04L 1/0045; H04L 1/0061; H04L 25/03343; H04L 25/03866; G06F 11/221; H04J 2203/006
USPC .......... 370/366, 463, 535–545, 241, 242–245
See application file for complete search history.

(56) References Cited

U.S. PATENT DOCUMENTS

| | | | |
|---|---|---|---|
| 5,668,810 A | 9/1997 | Cannella, Jr. | |
| 7,257,655 B1 | 8/2007 | Burney et al. | |
| 2006/0022850 A1* | 2/2006 | Grimsrud | 341/50 |
| 2006/0126751 A1* | 6/2006 | Bessios | 375/264 |
| 2008/0114562 A1* | 5/2008 | Sul et al. | 702/122 |
| 2010/0153799 A1* | 6/2010 | Maroni et al. | 714/735 |
| 2011/0087806 A1* | 4/2011 | Mohanty et al. | 710/16 |
| 2011/0271155 A1* | 11/2011 | Tran | 714/704 |

OTHER PUBLICATIONS

Stauffer, David R. and Beukema, Troy; Differential Group Delay Impact on Unscrambled 8 GFC Electrical Links; T11.2 Electrical Working Group; Apr. 2006; pp. 1-13.*

Stauffer, David R. and Beukema, Troy; Differential Group Delay Impact on Unscrambled 8 GFC Electrical Links; T11.2 Electrical Working Group; Apr. 2006; pp. 1-13; http://www.t11.org/ftp/t11/member/fc/pi-4/06-246v0.pdf.

* cited by examiner

*Primary Examiner* — Awet Haile
*Assistant Examiner* — Eric Myers
(74) *Attorney, Agent, or Firm* — Suiter Swantz pc llo

(57) ABSTRACT

Decision modules are strategically located along with various modules to route signals from either a test pattern generator or the data link layer through the various modules for performing scrambling, encoding, and serializing procedures on the signals before transmission of the signals on a serial bus. Decision modules are strategically placed along with various modules to route signals to either a test pattern checker or the data link layer through the various modules for performing descrambling, decoding, and deserializing procedures on the signals after receiving the signals from a serial bus.

20 Claims, 3 Drawing Sheets

DATA PATH UTILIZATION FOR LOW LEVEL PATTERN GENERATION AND CHECKIING

TECHNICAL FIELD

The present disclosure generally relates to the field of serial signal communications, and more particularly to devices and methods for processing signals for data communications and signal characterization utilizing serial communication protocols.

BACKGROUND

In serial communication protocol devices, there exists a requirement to characterize the signaling between devices. However, serial communication protocols vary in their requirements for the test data patterns used to perform such signal characterization. Further, said protocols are often under constant revision. For example, depending on the specific protocol, test data patterns may be required to be scrambled, encoded, serialized, or some combination of these operations. In addition to these test data pattern requirements, serial communication protocol devices also transmit and receive standard data signals which may also be required to be scrambled, encoded, serialized, or some combination of these operations, depending on the type of data or the specific protocol.

SUMMARY

A method of providing at least one signal to at least one transmitter of at least one PHY of a serial communication protocol device includes, but is not limited to: making at least one first selection between at least one first output signal associated with at least one test pattern generator and at least one output signal associated with at least one encoder, serializing, via at least one serializer, at least one of: the at least one first output signal associated with the at least one test pattern generator and the at least one output signal associated with the at least one encoder according to the at least one first selection, and providing serialized data to the at least one transmitter of the at least one first PHY.

A method of processing a serial signal from a receiver of a serial communication protocol device includes, but is not limited to: receiving the serial signal from the receiver via a single data path, deserializing the serial signal, and making a first selection between an output signal associated with a decoder and a deserializer, and an output signal associated with a descrambler and the decoder and the deserializer.

A serial communications protocol device including a plurality of transmitter-receiver pairs, where each of the transmitter-receiver pairs includes, but are not limited to: a test pattern generator for producing a test pattern signal, a first multiplexer for providing a first selected signal, the first multiplexer including a first input communicatively coupled to a link layer of the serial communications protocol device for receiving data signals and a second input communicatively coupled to the test pattern generator for receiving a first test pattern signal, a routing means for determining whether to scramble the first selected signal, a scrambler for scrambling the first selected signal to provide a scrambled signal, a second multiplexer for providing a second selected signal, the second multiplexer including a first input communicatively coupled to the scrambler for receiving the scrambled signal and a second input communicatively coupled to the routing means for receiving a non-scrambled signal, an encoder communicatively coupled to the second multiplexer for encoding the second selected signal to provide an encoded signal, a third multiplexer for providing a third selected signal, the third multiplexer including a first input communicatively coupled to the encoder for receiving the encoded signal and a second input communicatively coupled to the test pattern generator for receiving a encoded test pattern signal, and a serializer for serializing the third selected signal for transmission to an external serial bus.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
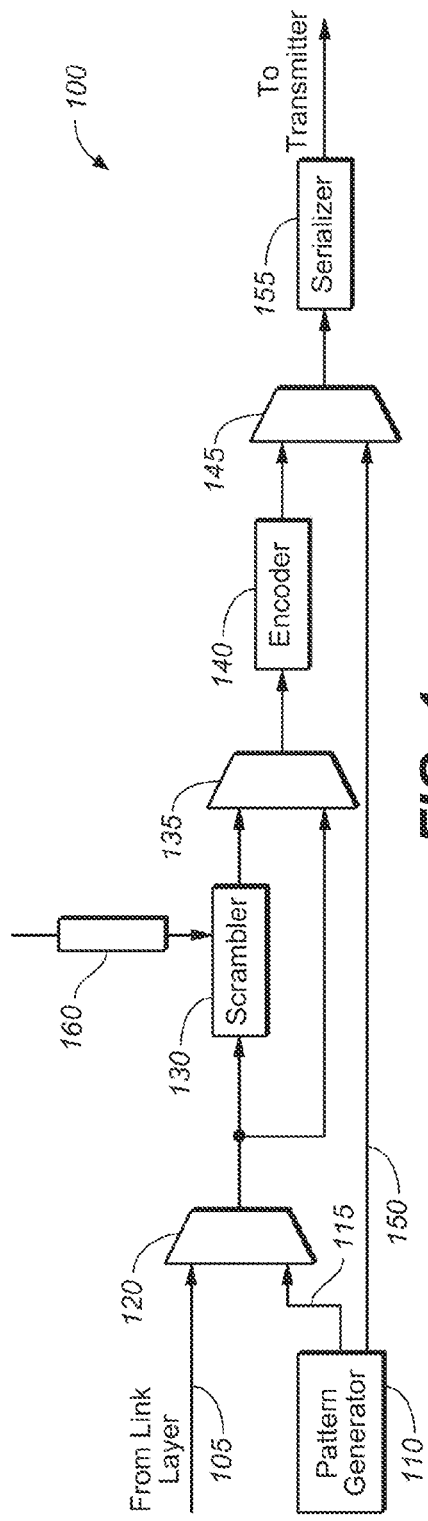
FIG. 1 is a block diagram illustrating signal processing circuitry for processing data signals and test patterns for transmission by a serial communication device.

An architecture for processing both test patterns for signal characterization for a serial communication protocol device and standard data signals to forward to a transmitter of the serial device is shown in FIG. 1. Architecture 100 may include a data path 105 for transmission of standard data signals from the link layer of the serial device to the architecture 100. For example, standard data signals may include primitives utilized to define the frames or packets of the serial communication protocol device. Primitives may also be utilized for performing low-level time critical functions of the serial communication protocol. Standard data signals may include the frames or packets of the serial communication protocol device. The frames or packets may perform the high-level functions of the serial communication protocol.

The architecture 100 may include pattern generator 110. Pattern generator 110 may generate test patterns for signal characterization for the serial communication protocol device. For example, pattern generator 110 may generate 8-bit un-encoded test patterns or 10-bit encoded test patterns (ex—8b/10b encoded test patterns). Although 8-bit to 10-bit encoding schemes are referred to in the present disclosure, other encoding schemes utilized by various communications protocols to map symbols from one format to another are contemplated by the present disclosure.

Pattern generator 110 may provide 8-bit un-encoded test patterns as an input to a selecting means via an 8-bit data path 115. Architecture 100 may include selecting means 120. Selecting means 120 may receive test patterns as an input from pattern generator 110. Selecting means 120 may also receive standard data signals as an input via data path 105. Selecting means 120 may select one of a test pattern input or a standard data signal input as an output signal of the selecting means 120. For example, selecting means 120 may include a multiplexer device configured to receive a control signal as input to select one of a test pattern input or a standard data signal input as an output signal of the selecting means 120.

Architecture 100 may include a scrambler module 130. Scrambler module 130 may perform a scrambling operation on an input signal to provide a scrambled output signal. Scrambler module 130 may receive the output signal of the selecting means 120 as an input. Scrambler module 130 may be configured to receive a control signal via control signal circuitry 160. Scrambler module 130 may be configured to restart a polynomial utilized for performing a scrambling operation based on the control signal.

Architecture 100 may include a second selecting means 135. Selecting means 135 may receive a scrambled output signal from scrambler module 130 as an input. Selecting means 135 may receive an output signal of the selecting means 120 as an input. Selecting means 135 may select one of the scrambled output signal input or an output signal of the selecting means 120 input as an output signal of the selecting means 135. For example, selecting means 135 may include a multiplexer device configured to receive a control signal as input to select one of a scrambled output signal input or an output signal of the selecting means 120 input as an output signal of the selecting means 135.

Architecture 100 may include an encoder module 140. Encoder module 140 may perform an encoding operation on an input signal to provide an encoded output signal. For example, an encoder operation may include encoding 8-bit un-encoded data as 10-bit encoded data. Encoder module 140 may receive an output signal of selecting means 135 as an input signal.

Architecture 100 may include a third selecting means 145. Selecting means 145 may receive an encoded output signal from encoder module 140 as an input. Selecting means 145 may receive a test pattern as an input. For example, selecting means 145 may receive a 10-bit encoded test pattern from pattern generator 110 via a 10-bit data path 150. Selecting means 145 may select one of the encoded output signal input or the test pattern input as an output signal of the selecting means 145. For example, selecting means 145 may include a multiplexer device configured to receive a control signal as input to select one of an encoded output signal input or the test pattern input as an output signal of the selecting means 145.

Architecture 100 may include a serializer module 155. Serializer module may perform a serializing operation on an input signal to provide a serialized output signal. For example, a serializing operation may utilize a shift register. Serializer module 155 may receive an output signal of selecting means 145 as an input signal. The serialized output signal of serializer module 155 may be forwarded to a transmitter of the serial device.

The serial output signal may be the result of various signal processing techniques. For example, the serialized output signal of architecture 100 may be a scrambled-encoded-serialized signal based on a test pattern generated by pattern generator 110. In another example, the serialized output signal of architecture 100 may be an encoded-serialized signal based on a test pattern generated by pattern generator 110. In another example, the serialized output signal of architecture 100 may be an un-encoded serialized signal based on a test pattern generated by pattern generator 110. In another example, the serialized output signal of architecture 100 may be a scrambled-encoded-serialized signal based on a standard data signal from the link layer of the serial device. In another example, the serialized output signal of architecture 100 may be an encoded-serialized signal based on a standard data signal from the link layer of the serial device. For example, some serial communications protocols do not scramble primitives. The various signal processing techniques may be enabled or disabled during the processing of a standard data signal, such that the various signal processing techniques may apply to only part of a transmission or the entirety of a transmission.

Architecture 100 may be included as signal processing circuitry of a single transmitter of the serial device. Further, architecture 100 may be included as signal processing circuitry of a single PHY of the serial device. A serial device may include multiple instances of architecture 100, one for every PHY of the serial device. As such, each PHY of the serial device may be independent. For example, each transmitter of the serial device may concurrently run utilizing different test patterns.

Figure 2:
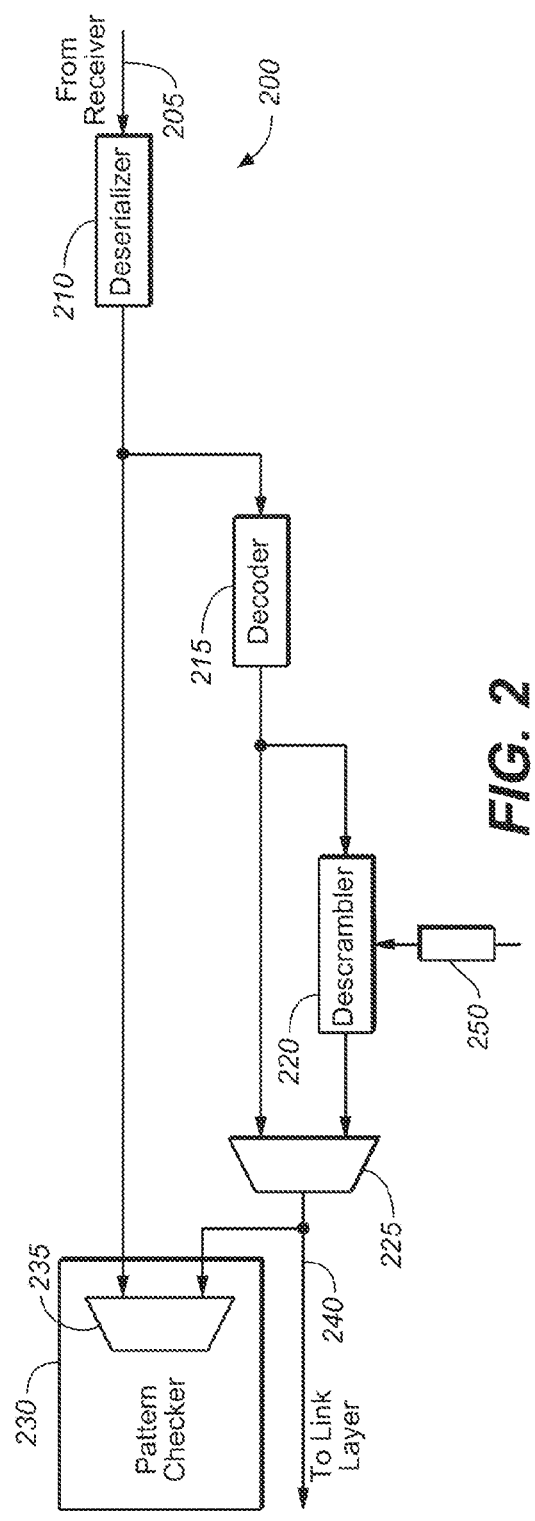
FIG. 2 is a block diagram illustrating signal processing circuitry for processing data signals and test patterns received by a serial communication device.

A circuit diagram representing an architecture for processing both test patterns for signal characterization for a serial communication protocol device and standard data signals from a receiver of the serial device is shown in FIG. 2. Architecture 200 may include a data path 205 for receiving a serial signal from a receiver of the serial device. Architecture 200 may further include a deserializer module 210. Deserializer module 210 may perform a deserializing operation on an input signal. For example, a deserializing operation may utilize a shift register. Deserializer module 210 may perform a deserializing operation on an input signal to provide a deserialized output signal. The deserialized output signal may be a 10-bit encoded signal. Deserializer module 210 may receive a serial signal from the receiver of the serial device as an input signal.

Architecture 200 may include a decoder module 215. Decoder module 215 may perform a decoding operation on an input signal to provide a decoded output signal. For example, a decoder operation may include decoding 8-bit un-encoded data from 10-bit encoded data. Decoder module 215 may receive a deserialized output signal from deserializer module 210 as an input signal.

Architecture 200 may include a descrambler module 220. Descrambler module 220 may perform a descrambling operation on an input signal to provide a descrambled output signal. Descrambler module 220 may received a decoded output signal from decoder module 215 as an input signal. Descrambler module 220 may be configured to receive a control signal via control signal circuitry 250. Descrambler module 220 may be configured to restart a polynomial utilized for performing a descrambling operation based on the control signal.

Architecture 200 may include a fourth selecting means 225. Selecting means 225 may receive a decoded output signal from decoder module 215 as an input. Selecting means may receive a descrambled output signal from descrambler module 220 as an input. Selecting means 225 may select one of the decoded output signal or the descrambled output signal as an output signal of the selecting means 225. For example, selecting means 225 may include a multiplexer device configured to receive a control signal as input to select one of the decoded output signal or the descrambled output signal as an output signal of the selecting means 225.

Architecture 200 may include a pattern checker module 230. Pattern checker module 230 may perform pattern matching on an input signal. For example, pattern checker module 230 may be utilized for signal characterization of the serial device. Pattern checker module 230 may receive a deserialized output signal from deserializer module 210 as an input signal. Pattern checker module 230 may receive an output signal of the selecting means 225 as an input signal.

Architecture 200 may include a fifth selecting means 235. Selecting means 235 may receive a deserialized output signal from deserializer module 210 as an input signal. Selecting means 235 may receive an output signal of the selecting means 225 as an input signal. Selecting means 235 may select one of the deserialized output signal or the output signal of the selecting means 225 as an input signal to pattern checker module 230. For example, selecting means 235 may include a multiplexer device configured to receive a control signal as input to select one of the deserialized output signal or the output signal of the selecting means 225 as an input signal to pattern checker module 230. Pattern checker module 230 may utilize selecting means 235 to select an input signal. Further, selecting means 235 may be included within pattern checker module 230. In another embodiment, selecting means 235 may in external to pattern checker module 230. Architecture 200 may provide a deserialized signal, a deserialized-decoded signal, or a deserialized-decoded-descrambled signal to pattern checker module 230 from a single data path 205 from a receiver of a serial device.

Architecture 200 may include a data path 240 to the link layer of the serial device for standard data signals received via data path 205. An output signal of the selecting means 225 may be routed to the link layer of the serial device via data path 240. Architecture 200 may be included as signal processing circuitry of a single receiver of the serial device. Further, architecture 200 may be included as signal processing circuitry of a single PHY of the serial device. A serial device may include multiple instances of architecture 200, one for every PHY of the serial device. Together, architecture 100 and architecture 200 may be included as signal processing circuitry of a single PHY (ex—a single transmitter-receiver pair) of the serial device. As such, each PHY of the serial device may be independent. For example, each receiver may concurrently run utilizing different test patterns.

Architecture 200 may process a data signal of a plurality of data formats. For example, a serial signal received from a receiver of the serial device via data path 205 may be a scrambled-encoded-serialized signal based on a test pattern. In another example, the serial signal received from a receiver of the serial device via data path 205 may be an encoded-serialized signal based on a test pattern. In another example, the serial signal received from a receiver of the serial device via data path 205 may be a serialized signal based on a test pattern. In another example, the serial signal received from a receiver of the serial device via data path 205 may be a scrambled-encoded-serialized signal based on a standard data signal. In another example, the serial signal received from a receiver of the serial device via data path 205 may be an encoded-serialized signal based on a standard data signal.

At least one of scrambler module 130, encoder module 140, decoder module 215, and descrambler module 220 may reuse previously tested and verified logic. As shown in FIGS. 1 and 2, only one scrambler module, one encoder module, one decoder module, and one descrambler module may be required to process both test patterns for signal characterization for a serial communication protocol device and standard data signals for each PHY of the serial device. Utilizing pattern generator 110 with independent scrambler module 130 and independent encoder module 140 to generate test patterns permits a single pattern generator design to generate test patterns meeting widely varying signal characterization requirements. Similarly, utilizing pattern checker 230 with independent descrambler module 220 and independent decoder module 215 to perform pattern matching permits a single pattern checker design to check test patterns meeting widely varying signal characterization requirements.

Figure 3:
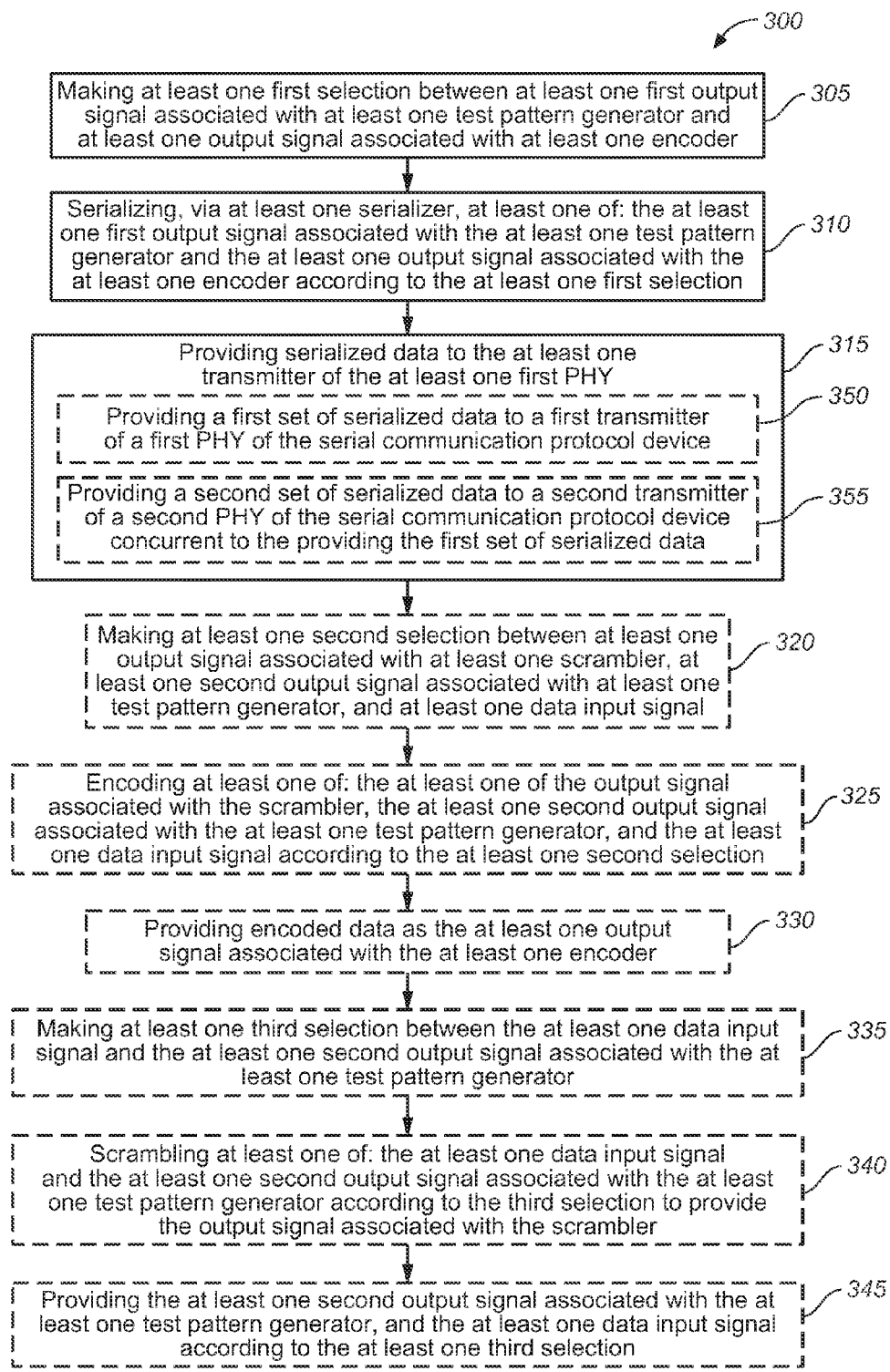
FIG. 3 is a flow diagram illustrating a method for providing at least one signal to at least one transmitter of at least one PHY of a serial communication protocol device.

Referring generally to FIG. 3, a method for providing at least one signal to at least one transmitter of at least one PHY of a serial communication protocol device is shown. Architecture 100 may be configured to perform method 300. The method 300 may include the step 305 representing making at least one first selection between at least one first output signal associated with at least one test pattern generator 110 and at least one output signal associated with at least one encoder 140. For example, selecting means 145 may select one of an encoded output signal or a test pattern input as an output signal of the selecting means 145. Method 300 may further include the step 310 representing serializing, via at least one serializer, at least one of: the at least one first output signal associated with the at least one test pattern generator and the at least one output signal associated with the at least one encoder according to the at least one first selection. For example, serializer module 155 may perform a serializing operation on an input signal to provide a serialized output signal. Serializer module 155 may receive an output signal of selecting means 145 as an input signal.

Method 300 may further include the step 315 representing providing serialized data to the at least one transmitter of the at least one first PHY. For example, the serialized output signal of serializer module 155 may be forwarded to a transmitter of the serial device. Step 315 of method 300 may include step 350 representing providing a first set of serialized data to a first transmitter of a first PHY of the serial communication protocol device. Step 315 of method 300 may include step 355 representing providing a second set of serialized data to a second transmitter of a second PHY of the serial communication protocol device concurrent to the providing the first set of serialized data. For example, a serial device may include multiple instances of architecture 100, one for every PHY of the serial device. As such, each PHY of the serial device may be independent. For example, each transmitter of the serial device may concurrently run utilizing different test patterns. Further, the first set and the second set of serialized data may require different formatting.

Method 300 may further include the step 320 representing making at least one second selection between at least one output signal associated with at least one scrambler, at least one second output signal associated with at least one test pattern generator, and at least one data input signal. For example, selecting means 135 may receive a scrambled output signal from scrambler module 130 as an input. Selecting means 135 may receive an output signal of the selecting means 120 as an input. Selecting means 120 may select one of a test pattern input or a standard data signal input as an output signal of the selecting means 120. Selecting means 135 may select one of the scrambled output signal input or an output signal of the selecting means 120 input as an output signal of the selecting means 135.

Method 300 may further include the step 325 representing encoding at least one of: the at least one of the output signal associated with the scrambler, the at least one second output signal associated with the at least one test pattern generator, and the at least one data input signal according to the at least one second selection. For example, encoder module 140 may perform an encoding operation on an input signal to provide an encoded output signal. Encoder module 140 may receive an output signal of selecting means 135 as an input signal.

Method 300 may further include step 330 representing providing encoded data as the at least one output signal associated with the at least one encoder. For example, encoder module 140 may perform an encoding operation on an input signal to provide an encoded output signal. Method 300 may further include step 335 representing making at least one third selection between the at least one data input signal and the at least one second output signal associated with the at least one test pattern generator. For example, selecting means 120 may receive un-encoded test patterns as an input from pattern generator 110. Selecting means 120 may also receive standard data signals as an input via data path 105. Selecting means 120 may select one of a test pattern input or a standard data signal input as an output signal of the selecting means 120.

Method 300 may further include step 340 representing scrambling at least one of: the at least one data input signal and the at least one second output signal associated with the at least one test pattern generator according to the third selection to provide the output signal associated with the scrambler. For example, scrambler module 130 may perform a scrambling operation on an input signal to provide a scrambled output signal as the output signal associated with the scrambler. Encoder module 140 may receive an output signal of selecting means 120 as an input signal.

Method 300 may further include step 345 representing providing one of the at least one second output signal associated with the at least one test pattern generator and the at least one data input signal according to the at least one third selection. For example, selecting means 120 may receive test patterns as an input from pattern generator 110. Selecting means 120 may also receive standard data signals as an input via data path 105. Selecting means 120 may select one of a test pattern input or a standard data signal input as an output signal of the selecting means 120

Figure 4:
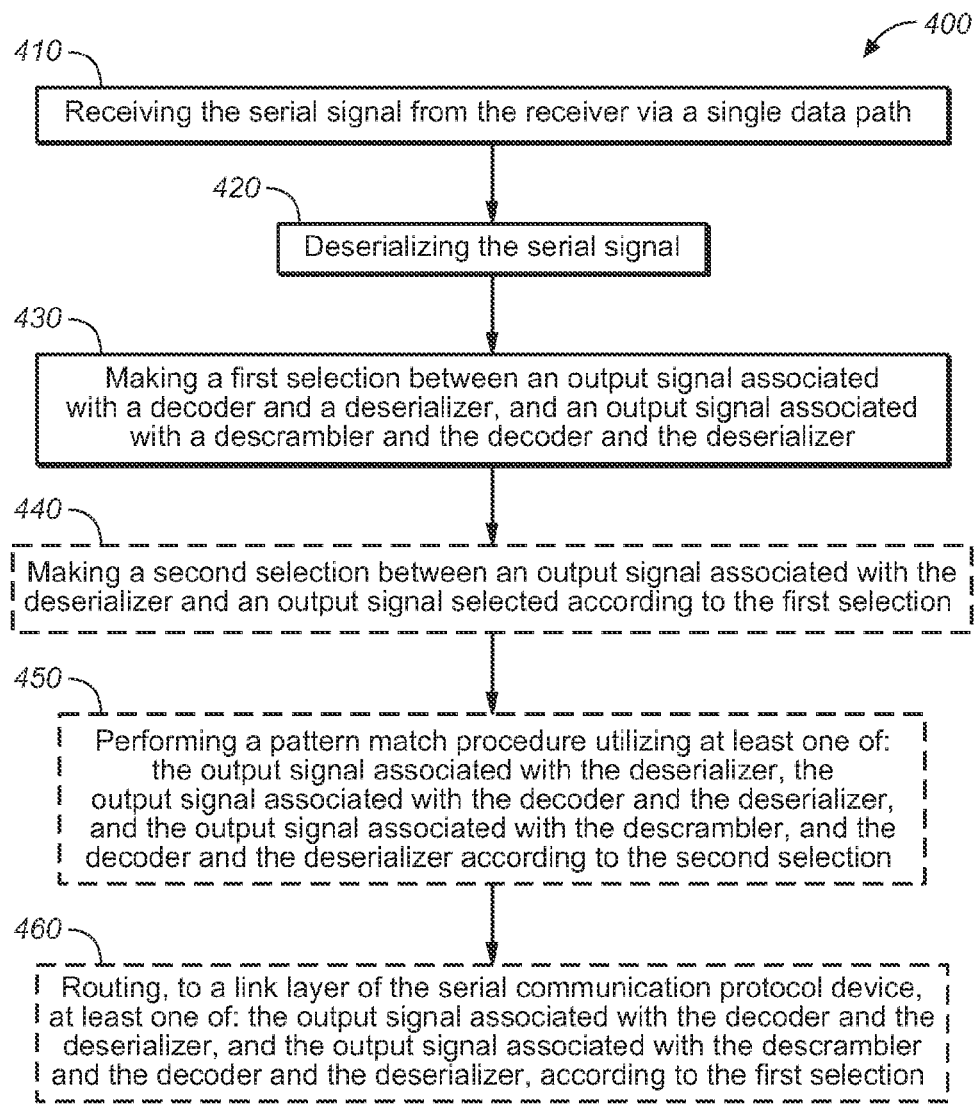
FIG. 4 is a flow diagram illustrating a method for processing a serial signal from a receiver of a serial communication protocol device.

Referring generally to FIG. 4, a method for processing a serial signal from a receiver of a serial communication protocol device is shown. Architecture 200 may be configured to perform method 400. The method 400 may include the step 410 representing receiving the serial signal from the receiver via a single data path. For example, architecture 200 may include a data path 205 for receiving a serial signal from a receiver of the serial device. Method 400 may further include the step 420 representing deserializing the serial signal. For example, deserializer module 210 may perform a deserializing operation on an input signal. Deserializer module 210 may receive a serial signal from the receiver of the serial device as an input signal.

Method 400 may further include the step 430 representing making a first selection between an output signal associated with a decoder and a deserializer, and an output signal associated with a descrambler and the decoder and the deserializer. For example, selecting means 225 may select one of the decoded output signal or the descrambled output signal as an output signal of the selecting means 225.

Method 400 may further include the step 440 representing making a second selection between an output signal associated with the deserializer and an output signal selected according to the first selection. For example, selecting means 235 may select one of the deserialized output signal or the output signal of the selecting means 225 as an input signal to pattern checker module 230.

Method 400 may further include the step 450 representing performing a pattern match procedure utilizing at least one of: the output signal associated with the deserializer, the output signal associated with the decoder and the deserializer, and the output signal associated with the descrambler, and the decoder and the deserializer according to the second selection. For example, pattern checker module 230 may perform pattern matching on an input signal. Pattern checker module 230 may utilize selecting means 235 to select an input signal.

Method 400 may further include step 460 representing routing, to a link layer of the serial communication protocol device, at least one of: the output signal associated with the decoder and the deserializer, and the output signal associated with the descrambler and the decoder and the deserializer, according to the first selection. For example, architecture 200 may include a data path 240 to the link layer of the serial device for standard data signals received via data path 205. An output signal of the selecting means 225 may be routed to the link layer of the serial device via data path 240.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a Compact Disc (CD), a Digital Video Disk (DVD), a digital tape, a computer memory, conventional floppy disk, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method of providing at least one signal to at least one transmitter of at least one PHY of a serial communication protocol device, comprising:

providing a standard data signal from a link layer of the serial communication protocol device to a first multiplexer, wherein the standard data signal is created within a link layer of the serial communication protocol device;

generating, by a test pattern generator, an un-encoded test pattern signal;

providing the un-encoded test pattern signal to the first multiplexer;

selecting, by the first multiplexer, a first selected signal from a plurality of inputs based on a particular control signal, the plurality of inputs including the un-encoded test pattern signal and the standard data signal, the first multiplexer including a first input communicatively coupled to the link layer of the serial communications protocol device for receiving the standard data signal and a second input communicatively coupled to the test pattern generator for receiving the un-encoded test pattern signal;

providing, by the first multiplexer, the first selected signal to a scrambler, wherein the scrambler is communicatively coupled to the first multiplexer and a second multiplexer;

receiving, by the scrambler, the first selected signal from the first multiplexer, wherein the scrambler further includes at least one control signal input for restarting a polynomial configured for producing a particular scrambled signal of the un-encoded test pattern signal and configured for producing a particular scrambled signal of the standard data signal;

scrambling, by the scrambler, the first selected signal to provide a scrambled signal;

outputting the scrambled signal to the second multiplexer;

selecting, by the second multiplexer, a second selected signal from a second plurality of inputs based on a particular control signal, the second plurality of inputs including the scrambled signal and the first selected signal, the second multiplexer including a first input communicatively coupled to the scrambler for receiving the scrambled signal and a second input communicatively coupled to the first multiplexer for receiving the first selected signal;

providing, by the second multiplexer, the second selected signal to an encoder;

encoding, by the encoder, the second selected signal to be an encoded signal;

providing, by the encoder, the encoded signal to a third multiplexer;

generating, by the test pattern generator, an encoded test pattern signal;

providing the encoded test pattern signal to the third multiplexer;

selecting, by the third multiplexer, a third selected signal from a third plurality of inputs based on a particular control signal, the third plurality of inputs including the encoded signal and the encoded test pattern signal wherein the third multiplexer includes a first input communicatively coupled to the at least one encoder for receiving the encoded signal and a second input communicatively coupled to the test pattern generator for receiving the encoded test pattern signal;

serializing, by a serializer, the third selected signal for transmission to an external serial bus; and providing serialized data to the at least one transmitter of the at least one first PHY, wherein the test pattern generator, the serializer, the encoder, and the scrambler are located within a phy layer of the serial communication protocol device.

2. The method of claim 1, wherein each of the at least one PHY is associated with a single transmitter, a single test pattern generator, a single encoder, and a single serializer.

3. The method of claim 1, wherein the encoder provides 8-bit to 10-bit encoding, wherein the un-encoded test pattern signal comprises an 8-bit un-encoded test pattern signal, and wherein the encoded test pattern signal comprises a 10-bit encoded test pattern signal.

4. The method of claim 1, wherein the scrambler further includes at least one control signal input for restarting a polynomial for producing at least one of: the scrambled signal of the un-encoded test pattern signal and the scrambled signal of the standard data signal.

5. The method of claim 1, the providing serialized data to the at least one transmitter of the at least one first PHY further including:

providing a first set of serialized data to a first transmitter of a first PHY of the serial communication protocol device; and providing a second set of serialized data to a second transmitter of a second PHY of the serial communication protocol device concurrent to the providing the first set of serialized data, wherein the first set of serialized data and the second set of serialized data are different.

6. The method of claim 1, wherein the first selected signal is the test pattern signal, wherein the second selected signal is the scrambled signal, wherein the third selected signal is a scrambled-encoded signal, and wherein the serialized data is scrambled-encoded-serialized data.

7. The method of claim 1, wherein the standard data signal comprises a primitive.

8. The method of claim 1, wherein the scrambler is configured to process both test patterns for signal characterization for the serial communication protocol device and standard data signals for each PHY of the serial communication protocol device.

9. The method of claim 8, wherein the encoder is configured to process both test patterns for signal characterization for the serial communication protocol device and standard data signals for each PHY of the serial communication protocol device.

10. The method of claim 1, wherein the same un-encoded test pattern signal is configured to be utilized by the scrambler and by the encoder.

11. A method of processing a serialized signal from a receiver of a serial communication protocol device, comprising:

receiving the serialized signal from the receiver via a single data path;

deserializing, by a deserializer, the serialized signal to provide a deserialized signal, wherein the deserializer is communicatively coupled to a decoder and a pattern matcher;

decoding, by the decoder, the deserialized signal to provide a decoded signal, wherein the decoder is communicatively coupled to the deserializer, a descrambler, and a first multiplexer;

providing, by the decoder, the decoded signal to the descrambler and the first multiplexer;

descrambling, by the descrambler, the decoded signal, wherein the descrambler further includes at least one control signal input for restarting a polynomial;

providing, by the descrambler, a descrambled signal to the first multiplexer, wherein the descrambler is communicatively coupled to the decoder and the first multiplexer;

receiving, by the first multiplexer, the descrambled signal from the descrambler;

selecting, by the first multiplexer, a first selected signal from a first plurality of inputs including the decoded signal and the descrambled signal based on a particular control signal, the first multiplexer including a first input communicatively coupled to the decoder for receiving the decoded signal and a second input communicatively coupled to the descrambler for receiving the descrambled signal;

receiving, by the pattern matcher, the deserialized signal from the deserializer and the first selected signal from the first multiplexer, wherein the pattern matcher is communicatively coupled to the deserializer and the first multiplexer;

performing, by the pattern matcher, a pattern match procedure on the deserialized signal and the first selected signal;

selecting, by a second multiplexer, a second selected signal from the deserialized signal and the first selected signal upon performing, by the pattern matcher, a pattern match procedure on the deserialized signal and the first selected signal, wherein the pattern matcher includes the second multiplexer; and routing, to a link layer of the serial communication protocol device, at least one of the deserialized signal and the first selected signal.

12. The method of claim 11, wherein the serialized signal comprises a scrambled-encoded-serialized signal.

13. The method of 11, wherein the decoder provides 10-bit to 8-bit decoding.

14. A serial communications protocol device including a plurality of transmitter-receiver pairs, each of the transmitter-receiver pairs comprising:

a test pattern generator for producing an un-encoded test pattern signal and an encoded test pattern signal;

a first multiplexer, the first multiplexer configured for providing a first selected signal from a plurality of inputs based on a particular control signal, the plurality of inputs including the un-encoded test pattern signal and a standard data signal, wherein the standard data signal is created within a link layer of the serial communication protocol device, the first multiplexer including a first input communicatively coupled to a link layer of the serial communications protocol device for receiving the standard data signal and a second input communicatively coupled to the test pattern generator for receiving the un-encoded test pattern signal;

a scrambler, the scrambler being communicatively coupled to the first multiplexer and a second multiplexer, wherein the scrambler further includes at least one control signal input for restarting a polynomial configured for producing a particular scrambled signal of the un-encoded test pattern signal and configured for producing a particular scrambled signal of the standard data signal, wherein the scrambler is further configured for:

receiving the first selected signal from the first multiplexer;

scrambling the first selected signal to provide a scrambled signal; and outputting the scrambled signal to the second multiplexer;

the second multiplexer for providing a second selected signal from a second plurality of inputs, the second plurality of inputs including the scrambled signal and the first selected signal, the second multiplexer including a first input communicatively coupled to the scrambler for receiving the scrambled signal and a second input communicatively coupled to the first multiplexer for receiving the first selected signal;

an encoder, the encoder being communicatively coupled to the second multiplexer and a third multiplexer, the encoder being configured for encoding the second selected signal to provide an encoded signal to the third multiplexer;

the third multiplexer for providing a third selected signal from a third plurality of inputs including the encoded signal and the encoded test pattern signal, the third multiplexer including a first input communicatively coupled to the encoder for receiving the encoded signal and a second input communicatively coupled to the test pattern generator for receiving the encoded test pattern signal;

a serializer for serializing the third selected signal for transmission to an external serial bus;

a deserializer for deserializing a received serial signal from an external serial bus to provide a deserialized signal, wherein the deserializer is communicatively coupled to a decoder and a pattern matcher;

the decoder communicatively coupled to the deserializer for decoding the deserialized signal to provide a decoded signal;

a descrambler, the descrambler being communicatively coupled to the decoder and a fourth multiplexer, the descrambler being configured for descrambling the decoded signal and providing a descrambled signal to the fourth multiplexer, wherein the descrambler receives a control signal for restarting a descrambling polynomial;

the fourth multiplexer for providing a fourth selected signal based on a particular control signal from a fourth plurality of inputs including the decoded signal and the descrambled signal, the fourth multiplexer including a first input communicatively coupled to the decoder to receive the decoded signal and a second input communicatively coupled to the descrambler for receiving the descrambled signal;

a pattern checker for performing pattern matching on the deserialized signal and the fourth selected signal, the pattern checker being communicatively coupled to the deserializer for receiving the deserialized signal, the pattern checker being further communicatively coupled to the fourth multiplexer for receiving the fourth selected signal, wherein the pattern checker includes a fifth multiplexer configured to select a fifth selected signal from a fifth plurality of inputs including the deserialized signal and the fourth selected signal; and a data path for providing the fourth selected signal to the link layer from the fourth multiplexer, wherein the test pattern generator, the serializer, the encoder, the scrambler, the deserializer, the decoder, the descrambler, and the pattern checker are located within a phy layer of the serial communication protocol device.

15. The method of claim 11, wherein the deserializer, the decoder, and the descrambler are located within a phy layer of the serial communication protocol device.

16. The serial communications protocol device of claim 14, wherein the standard data signal comprises a primitive.

17. The serial communications protocol device of claim 14, wherein the un-encoded test pattern signal is an 8-bit formatted signal, wherein the encoded test pattern signal is a 10-bit formatted signal, and wherein the decoder provides 10-bit to 8-bit decoding.

18. The serial communications protocol device of claim 14, wherein at least two of the transmitter-receiver pairs of the serial communications protocol device are configured to run concurrently, wherein each of the at least two of the transmitter-receiver pairs, which are configured to run concurrently, are configured to use different test pattern inputs.

19. The serial communications protocol device of claim 14, wherein each of the transmitter-receiver pairs is associated with a single test pattern generator, a single scrambler, a single encoder, a single serializer, a single deserializer, a single decoder, a single descrambler, and a single pattern checker.

20. The method of 11, wherein the decoded signal is an 8-bit formatted signal.

\* \* \* \* \*